Dec. 4, 1934.　　W. S. SAUNDERS ET AL　　1,983,192
BRAKE ACTUATING LEVER
Filed Jan. 28, 1932　　2 Sheets-Sheet 1
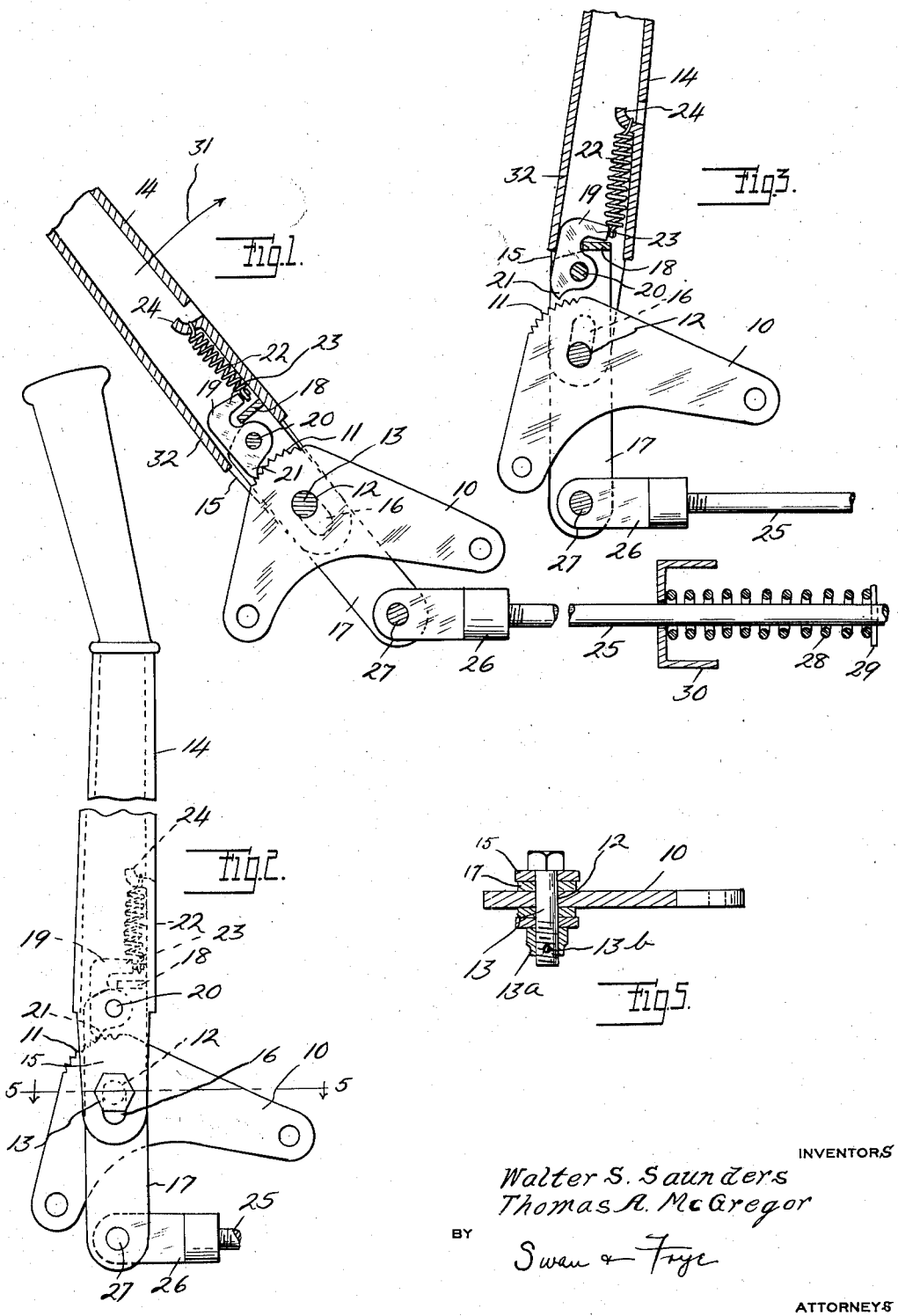
INVENTORS
Walter S. Saunders
Thomas A. McGregor
BY Swan & Frye
ATTORNEYS

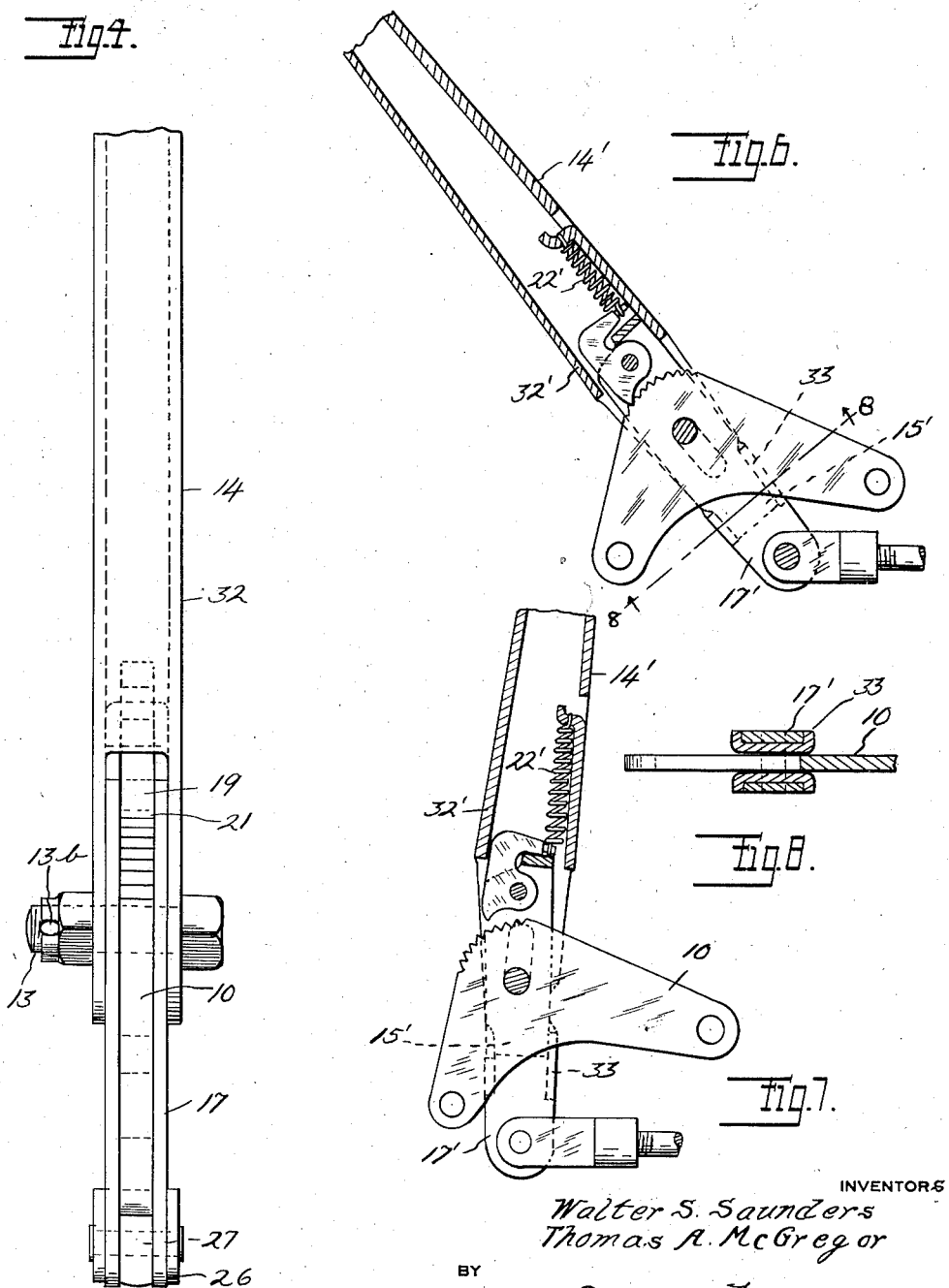

Patented Dec. 4, 1934

1,983,192

UNITED STATES PATENT OFFICE 1,983,192

BRAKE ACTUATING LEVER

Walter S. Saunders and Thomas A. McGregor, Pontiac, Mich., assignors to The American Forging and Socket Company, Pontiac, Mich., a corporation of Michigan Application January 28, 1932, Serial No. 589,419

8 Claims. (Cl. 74—536)

This invention relates to brake actuating mechanisms, and more particularly to an improved and simplified hand controlled brake lever and actuating mechanism especially suitable for use upon a vehicle for controlling the "emergency" or "hand" brake. An important object of the invention is the provision of such a brake actuating lever and associated parts which will be of less expensive manufacture than those now in common use, yet easier to operate, more attractive in appearance, and fully as rugged and durable.

In connection with most hand brake levers it has been the usual practice in the past to employ pawl and ratchet locking means for holding the brake lever in any desired set position. The releasing means which have been commonly employed to trip the pawl and allow movement of the brake lever to released position have usually been in the form of a button or small lever carried by and near the top of the main lever. In such constructions it has been found that such buttons and auxiliary levers become difficult to operate when the brakes are set hard, as the pawl binds against a ratchet tooth, and considerable force is required to release it. Our improved hand brake controlling mechanism is so designed, however, as to always be easily releasable, and binding of the pawl against the ratchet teeth cannot render movement of the handle lever difficult. In addition to such ease of operation, our invention has for a further object the entire doing away with auxiliary buttons or small grip levers at the tops of hand brake levers, and the construction of the same in such manner as to render the emergency brakes of a vehicle fully controllable by means of a single simple lever, without use of a special releasing device associated therewith.

Other objects and advantages will be apparent from the following description wherein reference is made to the accompanying drawings illustrating preferred embodiments of our invention, and wherein similar reference numerals designate similar parts throughout the several views.

In the drawings:

Figure 1 is a sectional elevational view taken substantially centrally through a preferred embodiment of our invention, the handle lever being partly broken away, showing the same in released position.

Figure 2 is a side elevational view thereof showing the mechanism positioned to set the brakes, and the lever locked in such position.

Figure 3 is a sectional elevational view showing the lever in substantially the same position, but unlocked and ready for release, the lever being also partly broken away.

Figure 4 is a front elevational view, the handle lever being partly broken away.

Figure 5 is a detail sectional view taken substantially on the line 5—5 of Figure 2 and looking in the direction of the arrows.

Figure 6 is a view similar to Figure 1 of a somewhat modified form of our invention, the spring return means shown in that view, however, being here omitted.

Figure 7 is a sectional view thereof similar to Figure 3, and

Figure 8 is a detailed sectional view taken substantially on the line 8—8 of Figure 6 and looking in the direction of the arrows.

Referring now to the drawings: Reference character 10 designates a ratchet plate provided with ratchet teeth 11 disposed upon a segmental upper surface thereof. Such plate may be in one of the forms now commonly employed, or any other deemed suitable, the ratchet teeth being arcuately disposed about the aperture 12 as a center. A pin, shown in the form of a bolt 13 having a partially smooth shank, traverses the aperture, and the tubular handle lever 14 is fulcrumed thereon, its lower end being bifurcated and the opposed bifurcated extremities 15 extending upon each side of the ratchet plate 10. Aligned vertically elongated slots 16 are formed in the lower end portions 15 of the handle lever, through which the fulcrum pin 13 passes, and the latter is suitably secured in position, as by a castellated nut 13ª and cotter pin 13ᵇ. Due to the slotting of the lever 14 it will be seen to be vertically movable, as well as rockable about the pin.

The main brake operating lever is separated from the handle lever, and is also fulcrumed on the pin 13, comprising the shorter lever 17, formed of two spaced but preferably integrally stamped sections joined at the top by the connecting portion 18, and disposed one on each side of the ratchet plate 10, each being between the plate and the adjacent handle lever bifurcation 15. The aligned apertures in the opposed sections of the lever 17 snugly fit the pin 13, so that while the lever is rockable thereabout it is not slidable with respect to the pin as is the handle lever 14. When the handle lever is in its lowermost position, so that the top of the slot 16 therein engages the pin 13, as shown in Figures 1 and 2, the upper extremity of the shorter brake lever 17 extends into the tubular upper portion of the handle lever, as there shown.

The pawl 19 is fulcrumed on a pin 20 extending between and secured in suitable apertures in the opposed sections of the lever 17, and is formed with a lower toothed lever arm 21 engaging the ratchet teeth 11. The portion 21 is normally maintained in engagement with the ratchet teeth 11 by the tensile spring 22, which draws upwardly the upper offset lever arm 23 of the pawl, to which the lower end of the stressed spring is secured (Figure 1). The upper end of the spring is secured to the handle lever 14, as by striking in the tab 24 therefrom to furnish a hook for such purpose. The pawl is also preferably overweighted, on its left side as viewed in the drawings, so that the force of gravity also tends to maintain the toothed arm 21 in engagement with the ratchet teeth.

The lower end of the shorter lever 17 is connected to the braking mechanism, usually by means of a cable or rod, as 25, (Figure 1) which is threaded in or otherwise suitably secured to the connecting link 26, pivotally secured to the lower extremity of the lever 17, as by the pin 27. In the drawings the rod 25 may be considered as extending toward the rear of the vehicle, the hand brake being normally applied by pulling the upper end of the handle lever in the same direction. We preferably provide a relatively strong spring to constantly urge the rod 25 rearwardly and the levers forwardly, toward the position in which the brakes are released. This may be in the form of a compression spring 28 encircling the rod, which bears against a pin 29 transfixing the rod, and a chassis brace member, shown as a channel bar 30. Of course the individual brakes are also usually provided with spring means for normally holding them in released position, and such springs tend to draw the rod 25 in the same direction. While it is possible to rely solely on the effect of the springs incorporated in the brakes however, we preferably augment their effect by utilizing some such auxiliary spring means as that described.

When it is desired to apply the brakes, the handle 14 may be drawn rearwardly, in the direction of the arrow 31 of Figure 1, in the customary manner. The pawl 19 is free to rock about the pin 20 sufficiently to enable it to ride over the ratchet teeth during such movement, though the handle 14 be, and in fact ordinarily is in its lowermost position, as shown in Figures 1 and 2. When the handle lever is moved rearwardly while in this lowered position, the lower front wall portion of its tubular section (designated 32) engages the brake operating lever 17 and enables movement of the two levers as a unit. When it is desired to release the brake by moving the handle forwardly, the handle lever is pulled upwardly as far as permitted by the elongated slot 16, in which position the portion 32 of the tubular wall of the handle lever clears the top of the lever 17, as shown in Figure 3. The upper front edge of the pawl 19 may then be contacted by the wall portion 32, by a rearward movement of the handle lever, thereby swinging the pawl to the position shown in Figure 3, releasing its toothed arm 21 from engagement with the ratchet teeth. The operator may then allow free forward movement of the handle under the influence of the spring 28 by simply loosening his grasp on the handle member, which when released, again drops downwardly to the lowered position shown in Figure 1 in which the top of the slot 16 engages the pin 13; due to the weight of the lever, aided by the influence of the spring 22. It will be noted that with our improved construction, if the brakes are set so tightly that the pawl is firmly wedged against one of the ratchet teeth, it may nevertheless be easily released by a slight rearward pull upon the hand lever after it has been raised, due to the great leverage which may be thereby exerted.

In Figures 6, 7 and 8 we have shown a somewhat modified but similarly operable form of our invention, in which additional engagement between the handle lever 14' and the power-transmitting or brake lever 17' is provided by downwardly elongating the bifurcated ends 15' of the handle lever, and providing either them or the adjacent portions of the lever 17', here shown as the latter, with laterally projecting edge portions 33 forming sockets for reception of the spaced lower ends of the handle lever when it is in lowered position, thereby insuring movement of the levers 14' and 17' as a rigid unit. When the handle lever is moved upwardly, as shown in Figure 7, the lower ends 15' of the handle lever clear the sockets formed by the portions 33 of the brake lever 17', while the upper front wall 32' of the tubular portion of the hand lever also clears the top of the lever 17' and when the handle lever is rocked rearwardly to a slight extent engages the pawl, as shown in Figure 7, to trip it in the manner previously described in connection with the embodiment first disclosed.

The spring 22 (or 22' in the second embodiment) will be seen to be additionally adapted to act as an anti-rattling spring, yieldably holding the handle lever against the side of the lever 17 (or 17') when not in use, to prevent their mutual movement under vibration of the vehicle. The partial housing of the mechanism within the tubular portion of the handle lever and the inherent design result in an extremely compact and simple assembly the parts of which are also protected against damage in a novel and highly desirable manner. The great ruggedness of the design will also be apparent, while the extreme ease with which the device may be operated, even, as above remarked, when the handle is tightly pulled back until the brakes are locked, is a feature of great importance, as women and persons possessing but little strength do not now hesitate to drive motor cars. Furthermore, the modern relative positioning of the hand brake lever and driver's seat of an automobile is such that the upward and rearward pull upon the handle lever required to release our improved brake lever is an easy and natural movement.

While it will be apparent that the illustrated embodiments of our invention herein disclosed are well calculated to adequately fulfill the objects and advantages primarily stated, it is to be understood that the invention is susceptible to variation, modification and change within the spirit and scope of the subjoined claims.

What we claim is:

1. In a brake controlling mechanism, a fulcrum pin, a handle lever having a slotted portion through which the pin extends, said pin and slot connection forming the only fulcrum for said lever, whereby said lever is swingable about and also bodily movable laterally of the pin, a brake lever independently pivoted on said pin, pawl and ratchet means partly carried by the lever for locking said lever in desired angular positions, and means including a portion of the handle lever engageable with the pawl to release the same upon lateral shifting of the handle lever to one position, said portion being engageable with the brake lever but not the pawl when the handle lever is shifted to another position, to enable swinging the brake lever by means of the handle lever without interfering with the operation of the pawl.

2. In a brake controlling mechanism, a swingable brake lever, pawl and ratchet means partly carried by the brake lever for maintaining said lever in desired positions, a handle lever, lost motion connection between the handle lever and brake lever and forming a pivotal support for the handle lever, said handle lever having a portion spaced from said lost motion connection connectible with the brake lever to move the latter, said handle lever also being connectible to said pawl and ratchet means by bodily shifting said lever relatively to said lost motion connection.

3. In a brake controlling mechanism, a fulcrum pin, a brake lever, pawl and ratchet means partly carried by said lever for locking the latter in desired positions, a handle lever having a slot through which said pin extends and forms a pivotal support for said lever, a portion of the handle lever spaced from said pin and slot being engageable with the brake lever to enable substantially unitary movement of the levers, said handle lever being also connectible with the pawl and ratchet means when in one position to which it may be moved by virtue of said pin and slot connection, and means comprising a portion carried by the brake lever for preventing such connection of the handle lever with the pawl and ratchet means when said handle lever is in another position to which it may be moved by virtue of said pin and slot connection.

4. In a brake controlling mechanism, a pivot pin, a brake lever fulcrumed thereon, locking means carried partly by the brake lever and partly by a fixed member for locking the brake lever in desired angular positions, and a handle lever also swingable about the pivot pin and having a slot therein through which said pin extends, said handle lever also having a portion engageable with the brake lever to move the same when the handle lever is in one position to which it may be moved by virtue of said pin and slot connection, and a portion carried by the brake lever and engageable by a portion carried by the handle lever when the latter is in another position to which it may be moved by virtue of said pin and slot connection to prevent engagement of the locking means by the handle lever.

5. In a brake controlling mechanism, a pivot pin, a brake lever fulcrumed thereon, pawl and ratchet means partly carried by the brake lever, the pawl and ratchet being normally in engagement with each other, for locking the brake lever in set angular positions, a handle lever mounted upon the pivot pin by means of a slot through which said pivot pin extends to swingably support said lever to permit its movement bodily independently of the pivot pin and brake lever, connecting means spaced from the pivot pin for coupling the handle lever and brake lever to enable pivotal movement of the latter by the former, including a portion carried by the brake lever for preventing engagement of the pawl and ratchet means by the handle lever, said portion and the pawl and ratchet means being so arranged that the handle lever may be moved clear of such portion and into engagement with the pawl and ratchet means upon moving the handle lever independently relatively to the handle lever and pivot pin.

6. In a brake controlling mechanism, a pivot pin, a brake lever fulcrumed thereon, a ratchet member appurtenant the brake lever, a pawl carried by the brake lever for locking the same in desired angular positions, a handle lever also fulcrumed on the pivot pin and engageable with the brake lever for moving the same, said handle lever being additionally movable independently of the brake lever, means engageable with the pawl upon such independent movement of the handle lever to enable releasing the pawl from locked position, and a spring for urging the pawl against the ratchet, said spring being also arranged to yieldably maintain the handle lever against such independent movement relatively to the brake lever.

7. In a brake controlling mechanism, a swingable brake lever, pawl and ratchet means for maintaining the brake lever in desired positions, a handle lever movable in one direction to move the brake lever and movable in another direction independently of the brake lever to release the pawl and ratchet, and a spring for controlling the operation of the pawl, said spring also serving to yieldably maintain the brake lever and handle lever in desired relative positions.

8. In a brake controlling mechanism, a relatively short brake lever, a ratchet appurtenant the same, a pawl carried by the lever for locking the latter in desired positions of adjustment, a handle lever movable substantially unitarily with the brake lever, and also independently movable in another direction in which the brake lever cannot be moved, means adapted upon such independent movement of the handle lever to release the pawl from locked position, and a spring for controlling the operation of the pawl, said spring also serving to yieldably maintain the brake lever and handle lever in desired relative positions.

WALTER S. SAUNDERS.
THOMAS A. McGREGOR.